United States Patent
Sage

[11] 3,714,581
[45] Jan. 30, 1973

[54] FIXED MEMORY INTEGRATOR
[75] Inventor: George E. Sage, Redmond, Wash.
[73] Assignee: Honeywell Inc., Minneapolis, Minn.
[22] Filed: Sept. 19, 1969
[21] Appl. No.: 859,402

[52] U.S. Cl. .................. 325/473, 325/323, 328/127, 388/165
[51] Int. Cl. ............................................... H04b 1/10
[58] Field of Search ...... 325/473, 323; 328/127, 131, 328/165

[56] References Cited

UNITED STATES PATENTS

| | | | |
|---|---|---|---|
| 3,268,824 | 8/1966 | Hinrichs | 325/323 |
| 3,428,905 | 2/1969 | Fierston et al. | 328/127 |
| 3,433,936 | 3/1969 | Blanke | 328/127 |
| 3,403,345 | 9/1968 | Frank et al. | 328/165 |

*Primary Examiner*—Samuel Feinberg
*Assistant Examiner*—S. C. Buczinski
*Attorney*—Charles J. Ungemach, Ronald T. Reiling and Charles L. Rubow

[57] ABSTRACT

An integrating circuit which overcomes the effects of spurious noise signals while detecting pulses of a known time duration but occurring at an unknown time. The circuit samples the incoming signal in successive equal time segments, and applies the signal during each segment associated sample to a separate one of a plurality of integrating circuits equal to the number of time segments in pulse. The continuous sum of the signals from all the integrators is level detected to determine the occurrence of a pulse of the predetermined width.

2 Claims, 3 Drawing Figures

PATENTED JAN 30 1973 3,714,581

INVENTOR.
GEORGE E. SAGE

BY Bruce C. Lutz

ATTORNEY

INVENTOR.
GEORGE E. SAGE

FIXED MEMORY INTEGRATOR

THE INVENTION

The present invention is concerned generally with electronic circuits and more specifically with an integrator for detecting signal pulses as opposed to spurious noise pulses.

In the prior art the detection of a signal in the presence of a large amount of background noise was often difficult, if not impossible, especially after rectification of the incoming signal. The occurrence of random or spurious pulses could charge a short time constant integrator to a value indicating that a pulse had occurred when in fact it had not. If a long time constant integrator were used and if the starting time of the pulse to be detected were not known, the noise would produce a total integrated value fast enough to completely mask the occurrence of an actual signal pulse.

The present invention on the other hand divides up the total time period for a pulse into a plurality of time segments. An individual integrating circuit out of a plurality of such circuits is charged for each one of the time segments. In this manner the continuous summation of the signals from all the individual integration circuits may be used to determine the total integrated value, and thereby indicate the occurrence of a pulse when the summed signal exceeds a predetermined level. While large noise pulses may still occur, their contribution to the summed signals will normally be less than the setting at which a level detector is maintained for the purpose of discriminating against false signals and noise pulses.

It is therefore an object of this invention to provide an improved signal pulse detector.

Other objects and advantages of the present invention will be apparent from a reading of the specification and appended claims in conjunction with the drawings wherein:

Figure 2:
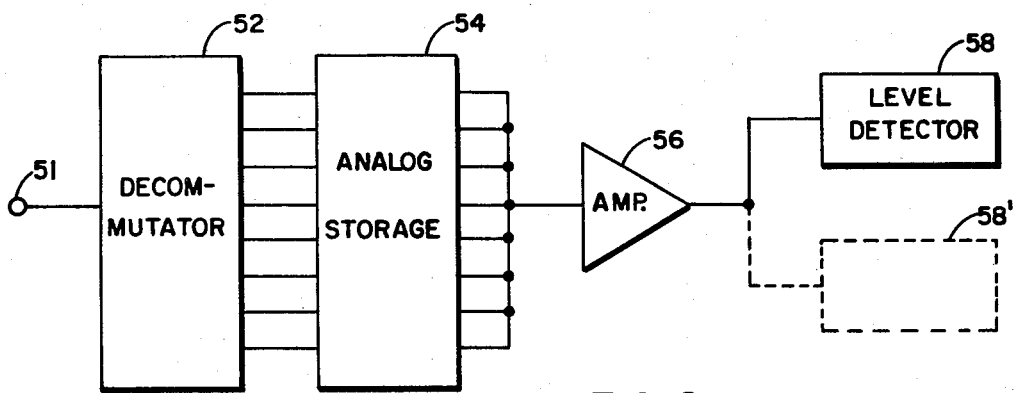
FIG. 2 is a system diagram incorporating the apparatus shown in FIG. 1.
Figure 3:
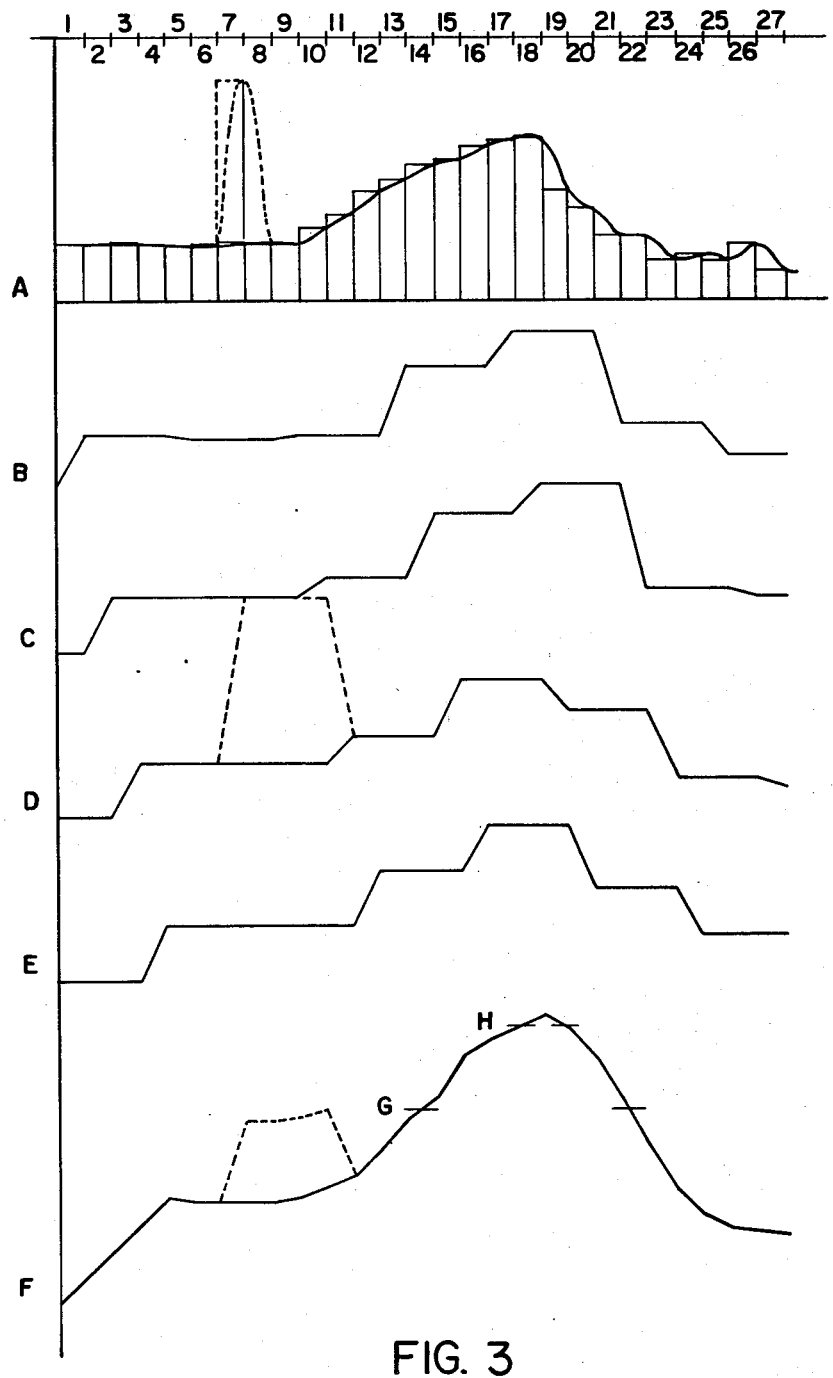

FIG. 3 comprises a series of waveforms for illustrating the operation of the system shown in FIG. 2.

DETAILED DESCRIPTION

Figure 1:
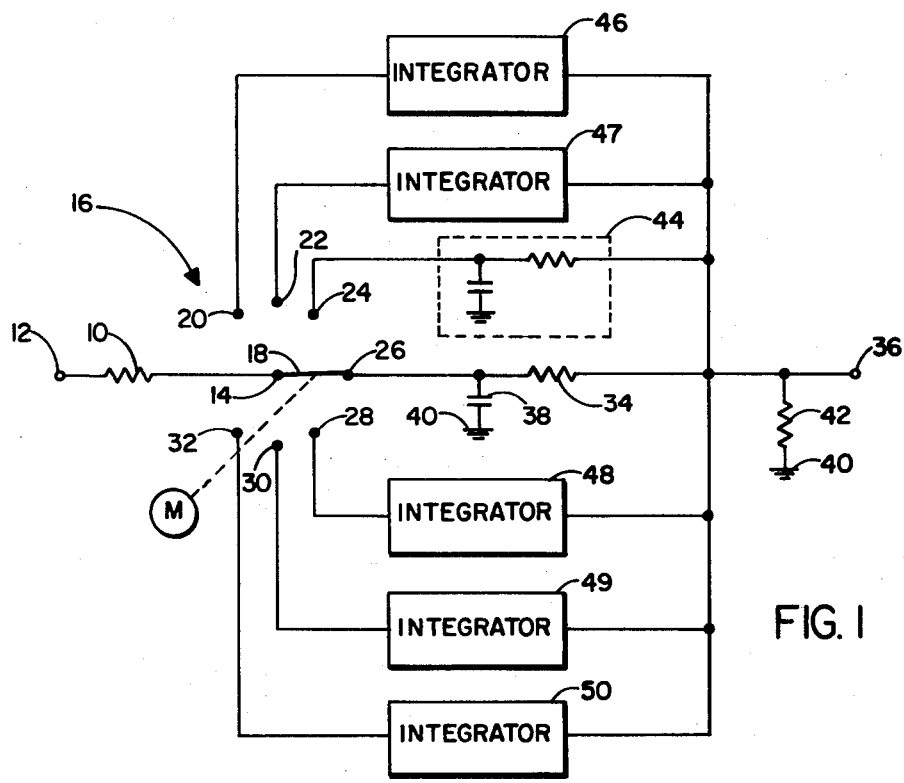
FIG. 1 is a block diagram of the applicant's invention showing a plurality of integrating circuits in combination with a signal distributor.

In FIG. 1, a resistor or impedance 10 is connected between an input terminal 12 and an input terminal 14 of a rotary switch generally designated as 16. Switch 16 has a rotating contact 18 which is driven by motor M to consecutively and continuously wipe contacts 20, 22, 24, 26, 28, 30 and 32. As shown in the drawing, rotating contact 18 connects input 14 of switch 16 with contact 26. Contact 26 is connected through an impedance 34 to an output terminal 36 of the apparatus of FIG. 1. A capacitor 38 is connected between contact 26 and ground or reference potential 40. The combination of capacitor 38 and resistor 34 form an integrating circuit. A further impedance or resistor 42 is connected between output terminal 36 and ground 40. A similar resistor-capacitor integrating circuit is shown in a dashed line box 44, and, is connected between contact 24 and terminal 36. The remaining boxes are also integrating circuits identified by reference numerals 46, 47, 48, 49 and 50, and are connected between the respective contacts 20, 22, 28, 30 and 32 and the output terminal 36.

FIG. 2 illustrates the overall system having an input 51 connected to a decommutator 52 which acts in substantially the same manner as rotary switch 16. A plurality of outputs from decommutator 52 are applied to an analog storage device 54 corresponding to the plurality of integrating circuits in FIG. 1. The outputs from the analog storage device are continuously summed and applied to an input of an amplifier 56 whose output is applied to one or more level detectors 58. A second dashed line level detector 58' is also shown and its function will be explained later.

Operation

Although FIG. 1 shows seven integrating circuits and FIG. 2 shows eight lines from decommutator 52 to analog storage device 54, the waveform diagrams in FIG. 3 apply to apparatus having only four integrating circuits for the purposes of simplifying the description and illustration.

Illustrated waveforms A through F are each divided into 27 segments. Waveform A shows the general outline or amplitude envelope of a rectified signal being supplied to the apparatus. Waveforms B through E respectively illustrate the signals appearing in the four integrators during the 27 time segments. Waveform F represents the continuous summation of signals from the four integrators. The dashed line is utilized to show that there is only a slight effect on the summation even when noise occurs which is of a greater magnitude than a signal pulse.

As will be realized by those skilled in the art, a signal pulse initially may be only four time segments wide, and yet after being transmitted through a long transmission line, can degenerate into a rather drawn out signal, such as is shown in waveform A. This is due to various impedances in the transmission path.

The rectangular blocks which are superimposed upon waveform A are indicative of the amplitude of the signals which are stored in the analog storage portion of the apparatus during the corresponding time segments. The analog storage portion comprises the integrating circuits of FIG. 1 or analog storage block 54 of FIG. 2. Switch 16 or decommutator 52 supplies a sample of the rectified input signal to each of the four integrators associated with waveforms B through E during every fourth time segment. Thus, the first integrator receives a signal sample during each of the first, fifth, ninth, thirteenth, etc. time segments. The second integrator receives a signal sample during each of the second, sixth, tenth, etc. time segments. Signal samples are similarly received by the third and fourth integrators during the remaining time segments. Each time an integrator receives a new sample, the capacitor therein charges to a new value which is substantially equal to the amplitude of the input signal at the end of corresponding time segment. That value is retained in the integrator until a new sample is received.

Assuming that the circuit is in a completely discharged condition, the decommutator will initially apply the signal to the first integrator as indicated by the first rise in waveform B. The capacitor in that integrator will charge during the time segment to the amplitude of the incoming signal. For the next three time segments while the other integrators are being charged the capacitor in the first integrator will hold the indicated charge, or at least discharge no more than very slightly. During the second time segment the second integrator will charge from the zero condition, as indicated by the first rise in waveform C. The same occurs for the third and fourth integrators as indicated by waveforms D and E.

Considering waveform A without the large noise pulse, it will be observed that the summation of all the signals as shown in waveform F increases to a relatively constant value until the start of the signal pulse in time segment 10. In time segment 14 the summation rises to a first magnitude designated as G, and eventually in time segment 17, to a second magnitude designated as H. It soon thereafter in time segment 20 drops below the H magnitude and later in time drops below the G magnitude.

Observe now the effect of the large noise pulse which, while it occurs over two time segments, takes one time segment to build up to its maximum value and the following time segment to fall back to its initial value. The integrator associated with waveform D is the only integrator which will be affected by the noise pulse. As the signals from the four integrators, including the one having waveform D altered to account for the noise pulse, are summed, the dashed line alteration in waveform occurs. It will be noted that even though the noise pulse in the input signal has greater amplitude than the signal pulse summation, the signal during that time does not exceed the levels indicated as G or H.

In an operational embodiment of the device it is desirable to have at least 10 integrating circuits so that the time period of the actual signal pulse is divided into small time segments. This lessens the effect of a large noise pulse in a single one or two time segments.

Referring now to FIG. 1, it will be noted that switch 16 has a wiping contact 18 which is continuously rotated by motor M so that the input signal is consecutively and continuously changed from one integrating circuit to another. This process is referred to in FIG. 2 as decommutation. Thus, one integrating circuit charges or discharges for a predetermined time segment and then the next circuit charges for a predetermined time segment. Since the integrating circuits are then disengaged from the input signal there is no place to discharge and the signals are stored. Thus, using only four of the integrating circuits and having the rotational speed of switch 16 changed accordingly, the results of FIG. 3 may be obtained. As indicated, a larger number of integrating circuits will produce more accuracy in sensing actual signal pulses as indicated by the summation signal at output 36.

Referring to FIG. 2, it will be noted that two level detectors 58 and 58' are shown. If it is merely desired to have an indication that a pulse has occurred, a single level detector, such as detector 58, may be used. However, it may be desirable to have two levels of detection available, such as provided by detectors 58 and 58', to provide information that a pulse has probably occurred and that a pulse has definitely occurred. It will be apparent from the above description that it would take exceedingly large noise signals occurring consecutively in order to produce a summed signal output large enough to actuate both level detectors.

While the present invention is intended to be used with signals which are rectified so that the noise signals are not of random polarities, the apparatus will, of course, work with both rectified and non-rectified signals.

In summary, therefore, the present invention is directed toward the decommutation and storage of portions of an integrated signal whereby the total is continuously summed to produce an output indication that is substantially immune to noise signals.

Other integrating and decommutating network embodiments in accordance with this invention will, of course, be apparent to those skilled in the art, and I wish to be limited only by the scope of the following claims wherein I claim:

1. A method for detecting a signal pulse of known duration and occurring at an unknown time in an incoming signal which may contain noise components having greater amplitude than the signal pulse, said method comprising the steps of:
   continuously sampling the input signal;
   storing a number of successive samples just sufficient to cover a time interval equal to the duration of the signal pulse;
   summing signals indicative of all of the stored samples;
   sensing the level of the summation signal to detect a level indicative of the signal pulse; and
   replacing the oldest stored sample with the next successive unstored sample at time intervals equal to the length of one of said samples.

2. Integrating apparatus for detecting a signal pulse of known duration and occurring at an unknown time in an incoming signal which may contain noise components having greater amplitude than the signal pulse, said apparatus comprising:
   switching means for successively providing a signal path between an input terminal and each of plurality of output terminals, said switching means operating through a complete cycle in a time interval equal to the duration of the signal pulse;
   input means for supplying the incoming signal to the input terminal of said switching means;
   a plurality of integrating circuits equal in number to the plurality of output terminals of said switching means;
   means for connecting a separate one of said plurality of integrating circuits to each of the plurality of output terminals of said switching means;
   means for continuously summing the output signals of all of said plurality of integrating circuits; and
   detection means for determining when the summation of the output signals exceeds a predetermined level indicative of a signal pulse.

* * * * *